United States Patent
Schumacher et al.

(10) Patent No.: US 8,948,094 B2
(45) Date of Patent: Feb. 3, 2015

(54) METHOD AND APPARATUS FOR OPTIMIZING DOWNLINK TRANSMISSION IN A WIRELESS COMMUNICATION NETWORK

(75) Inventors: Joseph R. Schumacher, Glen Ellyn, IL (US); Mark G. Spiotta, Wheaton, IL (US); George F. Cummings, III, Gilbert, AZ (US)

(73) Assignee: Google Technology Holdings LLC, Mountain View, CA (US)

( * ) Notice: Subject to any disclaimer, the term of this patent is extended or adjusted under 35 U.S.C. 154(b) by 1378 days.

(21) Appl. No.: 12/210,734

(22) Filed: Sep. 15, 2008

(65) Prior Publication Data

US 2010/0067589 A1 Mar. 18, 2010

(51) Int. Cl.
*H04W 4/00* (2009.01)
*H04L 5/00* (2006.01)
*H04W 72/04* (2009.01)

(52) U.S. Cl.
CPC .......... *H04L 5/0007* (2013.01); *H04L 58/0058* (2013.01); *H04W 72/04* (2013.01); *H04L 5/0091* (2013.01)
USPC ........................................................ 370/329

(58) Field of Classification Search
USPC ........................................................ 370/329
See application file for complete search history.

(56) References Cited

U.S. PATENT DOCUMENTS

| | | |
|---|---|---|
| 2001/0017851 A1 | 8/2001 | Yamaguchi et al. |
| 2005/0286449 A1 | 12/2005 | Seo et al. |
| 2006/0083197 A1 | 4/2006 | Kang |
| 2007/0019667 A1 | 1/2007 | Mottier et al. |
| 2008/0075047 A1* | 3/2008 | Shankara ............... 370/337 |
| 2008/0240003 A1* | 10/2008 | Brunel et al. .......... 370/281 |

FOREIGN PATENT DOCUMENTS

WO WO2007004923 A1 1/2007

OTHER PUBLICATIONS

An, Byung IL: "The International Search Report and the Written Opinion of the International Searching Authority", Korean Intellectual Property Office, Daejeon, Republic of Korea, completed: Mar. 30, 2010, mailed: Mar. 31, 2010, all pages.
IEEE, "802.16, IEEE Standard for Local and Metropolitan Area Networks, Part 16: Air Interface for Fixed Broadband Wireless Access Systems,sections 8.4.4 through 8.4.4.2" IEEE Computer Society and the IEEE Microwave Theory and Techniques Society, Sponsored by the LAN/MAN Standards Committee, Oct. 1, 2004.

* cited by examiner

*Primary Examiner* — Ayaz Sheikh
*Assistant Examiner* — Mounir Moutaouakil
(74) *Attorney, Agent, or Firm* — Faegre Baker Daniels LLP

(57) ABSTRACT

A method and apparatus for optimizing downlink transmission in a wireless communication network (100) includes determining (502) a distance of each of a plurality of remote devices (102-114) from a network node (120) and allocating (506) downlink symbols of a frame (300) for the downlink transmission based on the determined distance of each of the plurality of remote devices. Earlier downlink symbols of the frame are allocated to at least one remote device of the plurality of remote devices positioned more distant from the network node in comparison to at least other remote device positioned less distant from the network node.

12 Claims, 7 Drawing Sheets

METHOD AND APPARATUS FOR OPTIMIZING DOWNLINK TRANSMISSION IN A WIRELESS COMMUNICATION NETWORK

FIELD OF THE DISCLOSURE

The present disclosure relates generally to a wireless communication network and more specifically to a method and apparatus for optimizing downlink transmission in the wireless communication network.

BACKGROUND

Wireless communication networks are widely deployed to provide various communication services such as voice, packet data, multi-media broadcast, and text messaging. These wireless communication networks may be multiple-access systems capable of supporting communication for multiple users by sharing the available network resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems. A CDMA system may implement Wideband CDMA (W-CDMA), and cdma2000. W-CDMA is described in documents from 3rd Generation Partnership Project (3GPP). CDMA2000 is described in documents from 3rd Generation Partnership Project 2 (3GPP2). 3GPP and 3GPP2 documents are publicly available. WiMAX (Worldwide Interoperability for Microwave Access)-based systems are being designed and developed for operation in licensed bands, such as 2.3 GHz, 2.5 GHz, 3.3 GHz, 3.5 GHz etc.

Existing Time Division Duplex (TDD) wireless communication networks typically specify an interval between an end of a downlink frame and a beginning of a subsequent uplink frame to allow the remote devices to decode the downlink frame and prepare for the uplink frame. However, the duration of the time interval imposes a limitation on the maximum distance between a downlink frame transmitter and a remote device that transmits the uplink frame in response to the downlink frame. As the remote device becomes more distant from a network node, the round trip delay between transmission of the downlink frame and reception of the uplink frame increases and therefore more bandwidth is consumed. The delay in the reception of the UL frame also increases interference. For the network node, it may be challenging to allocate system resources for such transmissions in an efficient manner.

Accordingly, there is a need for an improved and more efficient method and apparatus for optimizing downlink transmission in a wireless communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
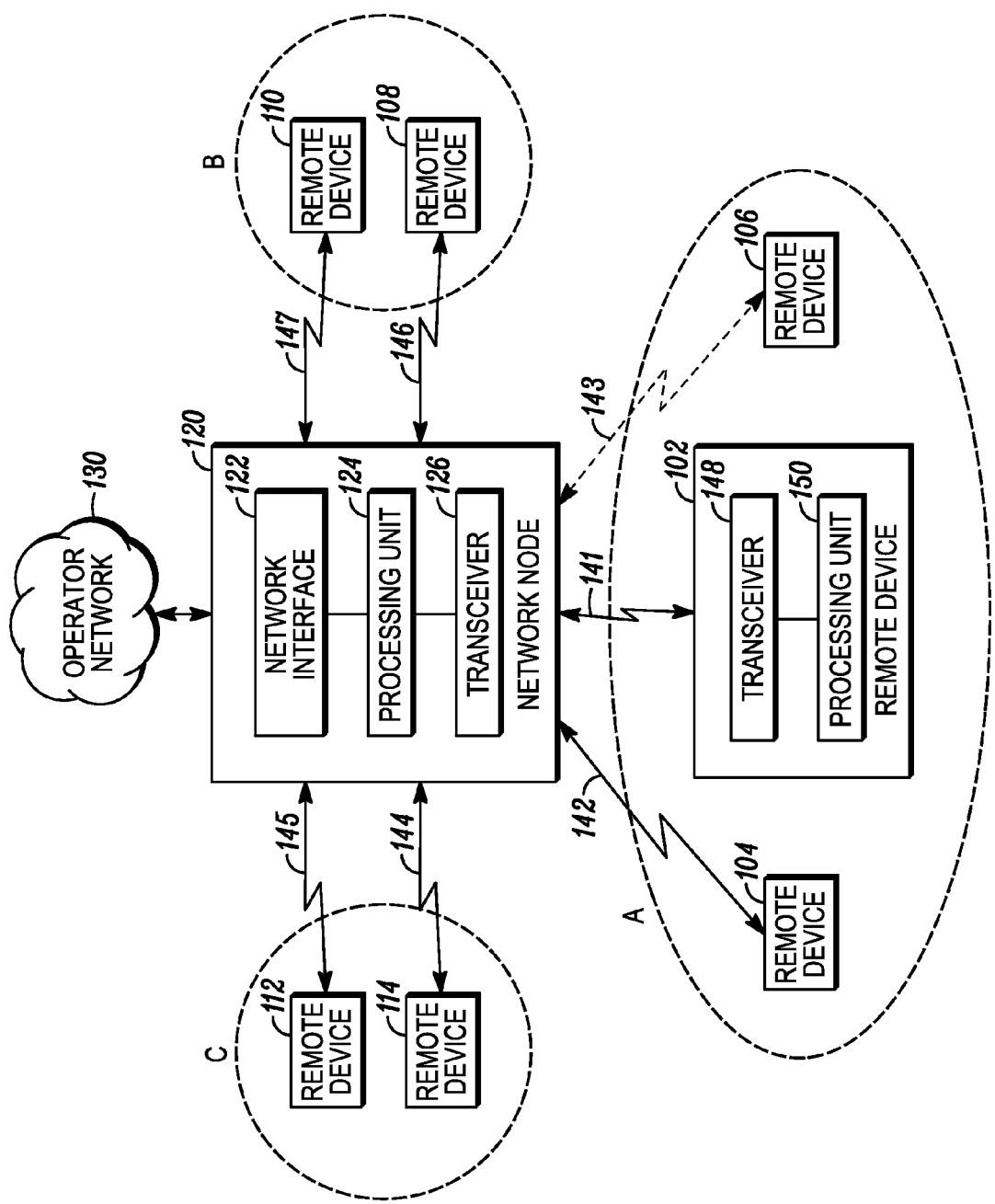
FIG. 1 is a system diagram illustrating a wireless communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present embodiment describes a method that includes determining a distance of each of a plurality of remote devices from a network node and allocating downlink symbols of a frame for the downlink transmission based on the determined distance of each of the plurality of remote devices, wherein earlier downlink symbols of the frame are allocated to at least one remote device of the plurality of remote devices positioned more distant from the network node in comparison to at least other remote device positioned less distant from the network node.

In another embodiment, the method includes receiving by at least one remote device of a plurality of remote devices a downlink frame via a downlink transmission from at least one network node and identifying allocation of earlier downlink symbols of the downlink frame of the received downlink transmission. The method further includes transmitting an uplink frame via an uplink transmission before decoding later downlink symbols of the frame after identifying the allocation of the earlier downlink symbols.

Referring now to the figures, FIG. 1 is a system diagram illustrating a wireless communication system 100 in accordance with some embodiments. At present, standards bodies such as OMA (Open Mobile Alliance), 3GPP (3rd Generation Partnership Project), 3GPP2 (3rd Generation Partnership Project 2), IEEE 802 (Institute of Electrical and Electronics Engineers), and Worldwide Interoperability for Microwave Access (WiMAX) Forum are developing standards specifications for wireless telecommunications systems. Communication system 100 represents a system having an architecture in accordance with one or more of the WiMAX technologies, suitably modified to implement the present invention. Alternative embodiments of the present invention may be implemented in communication systems that employ other or additional technologies such as, but not limited to, those described in the OMA, 3GPP2, IEEE 802, or 3GPP2 specifications.

Communication system 100 is depicted in a very generalized manner. For example, system 100 is shown to simply include remote devices 102-114, a network node 120, and an operator network 130. The network node 120 is shown providing network services to remote devices 102-114 using wireless interfaces 141-147, respectively. Wireless interfaces 141-147 are in accordance with the particular access technology supported by the network node 120. For example, they may all utilize the same technology such as one based on IEEE 802.16, or they may utilize different access technologies.

Each remote device 102-114 includes the capability to communicate with the network node 120 through one or more wireless communication protocols such as Advanced Mobile Phone System (AMPS), Code division multiple access (CDMA), Time division multiple access (TDMA), Global System for Mobile communications (GSM), Integrated Digital Enhanced Network (iDEN), General Packet Radio Service (GPRS), Enhanced Data rates for GSM Evolution (EDGE), Universal Mobile Telecommunications System (UMTS), Wideband Code Division Multiple Access (WCDMA), Code division multiple access 2000 (CDMA2000), and their variants. Each remote device 102-114 may also use ad-hoc communication to connect directly to each other and to execute applications that may utilize the ad-hoc connection.

Further, it should be understood that the present invention is not limited to mobile remote devices. Other types of wireless access terminals which may include fixed wireless terminals may be used. It should be understood that the term "remote device" in the claims and description below includes both mobile wireless communication devices (e.g., mobile phones, wireless handheld computers), stationary wireless terminals (e.g., fixed wireless router) or other electronic battery operated devices coupled to a network.

Those skilled in the art will recognize that FIG. 1 does not depict all of the physical fixed network components that may be necessary for system 100 to operate but only those system components and logical entities particularly relevant to the description of embodiments herein. For example, FIG. 1 depicts network node 120 comprising processing unit 124, transceiver 126, and network interface 122. The remote device 102 comprises a transceiver 148 and a processing unit 150. For a better understanding, exemplary internal components of the remote device 102 are described hereafter. However, it should be understood that the internal components of remote device 102 may also be found in the remote devices 104-114.

Remote devices 102-114 and the network node 120 are shown communicating via technology-dependent wireless interfaces. Remote devices, subscriber stations (SSs) or user equipment (UEs), may be thought of as mobile stations (MSs), mobile subscriber stations (MSSs) or mobile nodes (MNs). In addition, remote device platforms are known to refer to a wide variety of consumer electronic platforms such as, but not limited to, mobile stations (MSs), access terminals (ATs), terminal equipment, mobile devices, gaming devices, personal computers, and personal digital assistants (PDAs). Further, depending on the embodiment, any of remote devices 102-114 may additionally comprise a keypad (not shown), a speaker (not shown), a microphone (not shown), a display (not shown), and/or an external interface or multiple interfaces to computer equipment (e.g., USB, serial port, Ethernet, PC card, not shown). Processing units, transceivers, keypads, speakers, microphones, and displays as used in remote devices, network nodes, and/or content sources are all well-known in the art.

For example, processing units are known to comprise basic components such as, but neither limited to nor necessarily requiring, microprocessors, microcontrollers, memory devices, application-specific integrated circuits (ASICs), or logic circuitry. Such components are typically adapted to implement algorithms or protocols that have been expressed using high-level design languages or descriptions, expressed using computer instructions, expressed using signaling flow diagrams, or expressed using logic flow diagrams.

Thus, given a high-level description, an algorithm, a logic flow, a messaging/signaling flow, or a protocol specification, those skilled in the art are aware of the many design and development techniques available to implement a processing unit that performs the given logic. Therefore, remote devices 102-114 and network node 120 represent known devices that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, a network node may be implemented in or across one or more RAN components, such as a base transceiver station (BTS) or a base station controller (BSC), a Node-B or a radio network controller (RNC), or an High Rate Packet Data—Access Network (HRPD AN) or Packet Control Function (PCF), or implemented in or across one or more access network (AN) components, such as an access service network (ASN) gateway or ASN base station (BS), an access point (AP), a wideband base station (WBS), or a WLAN (wireless local area network) station.

Operationally, in accordance with some embodiments, the network node 120 determines a distance of each of the remote devices 102-114 from the network node 120. The network node 120 then allocates downlink symbols in a frame for the downlink transmission based on the determined distance of each of the remote devices 102-114. As shown in FIG. 1, remote devices 102, 104, and 106 are grouped as group A, remote devices 108 and 110 as group B, and remote devices 112 and 114 as group C. In one embodiment, the network node 120 groups the remote devices based on the determined distance of each of the remote devices. Each of the groups comprises at least one remote device of the remote devices. As an example, remote devices 102, 104, 106, which form group A are at a first distance from the network node 120. Remote devices 108 and 110 that form group B are at a second distance from the network node 120, and remote devices 112 and 114 which form group C are at a third distance from the network node 120. The first distance is the shortest distance between the network node 120 and group A. The second distance is longer than the first distance and therefore group B is farther from network node 120 as compared to group A. Similarly, the third distance is longer than the second distance, therefore longer than the first distance and therefore group C is farther from the network node 120 as compared to group A and group B.

In one embodiment, groups A, B, and C are categorized based on a range of distances from the network node 120. For example, group A may comprise of remote devices that lie in a range of 1 km-2 km from the network node 120, group B may comprise of remote devices that lie in the range of 2 km-3 km from the network node 120, and group C may comprise rest of remote devices that are communicating with the network node and are more distant from the network node 120 as compared to remote devices of group A and group B.

Based on whether the remote device belongs to group A, group B, or group C, the network node 120 allocates downlink symbols of the frame for the downlink transmission. Remote devices that belong to the group that is at the longest distance from a network node are assigned earlier downlink symbols of the frame for the downlink transmission. For example, remote devices 112 and 114 belong to group C, which is for the devices that are the longest distance from the network node 120. Therefore, during the exchange of frames between the network node 120 and the remote devices 112, 114, the remote devices 112, 114 will be allocated earlier downlink symbols of a downlink frame, so as to reduce the overall round-trip delay. In this case, the remote devices 112 and 114 will not have to wait to decode the entire downlink frame before initiating an uplink transmission. This procedure will potentially reduce subscriber station receive-transmit transition gap (SSRTG) and a transmit-receive gap (TTG) between the remote devices 112 and 114, and the network node 120, and thus reducing the overall round-trip delay.

In one embodiment, the network node 120 assigns later downlink symbols of the frame for the downlink transmission to the remote devices that belong to the group that is at a closer distance from the network node in comparison to the group which is at a longer distance. For example, the network node 120 may assign later downlink symbols to the remote device 108 and 110 as compared to remote devices 112 and 114, and later downlink symbols to remote devices 102, 104, and 106 as compared to remote devices 108 and 110. Further, while only seven remote devices and three groups are shown in FIG. 1, it is understood that the communication system 100 may provide access to more than seven remote devices and more than three groups.

In one embodiment, the processing unit 124 is coupled to the transceiver 126 and is adapted to determine a distance of each of the a plurality of remote devices from the network node 120 and allocate downlink symbols of a frame for a downlink transmission based on the determined distance of each of the plurality of remote devices. In another embodiment, the processing unit 124 is adapted to group the plurality of remote devices based on the determined distance of each of the plurality of remote devices from the network node 120.

In another embodiment, the processing unit 150 is coupled to the transceiver 148 and is adapted to receive a downlink transmission from at least one network node, identify allocation of earlier downlink symbols of a downlink frame of the downlink transmission, and transmit an uplink frame via an uplink transmission before decoding later downlink symbols of the frame after identifying the allocation of the earlier downlink symbols.

In one embodiment, the assignment of the earlier downlink symbols or later downlink symbols to a remote device depends on the particular number of remote devices contending, the relative amount of resources presently utilized by the remote devices who are a part of the system, the current loading conditions (e.g., an overloaded condition verses a lightly loaded condition) of particular network nodes or content sources, etc.

Figure 2:
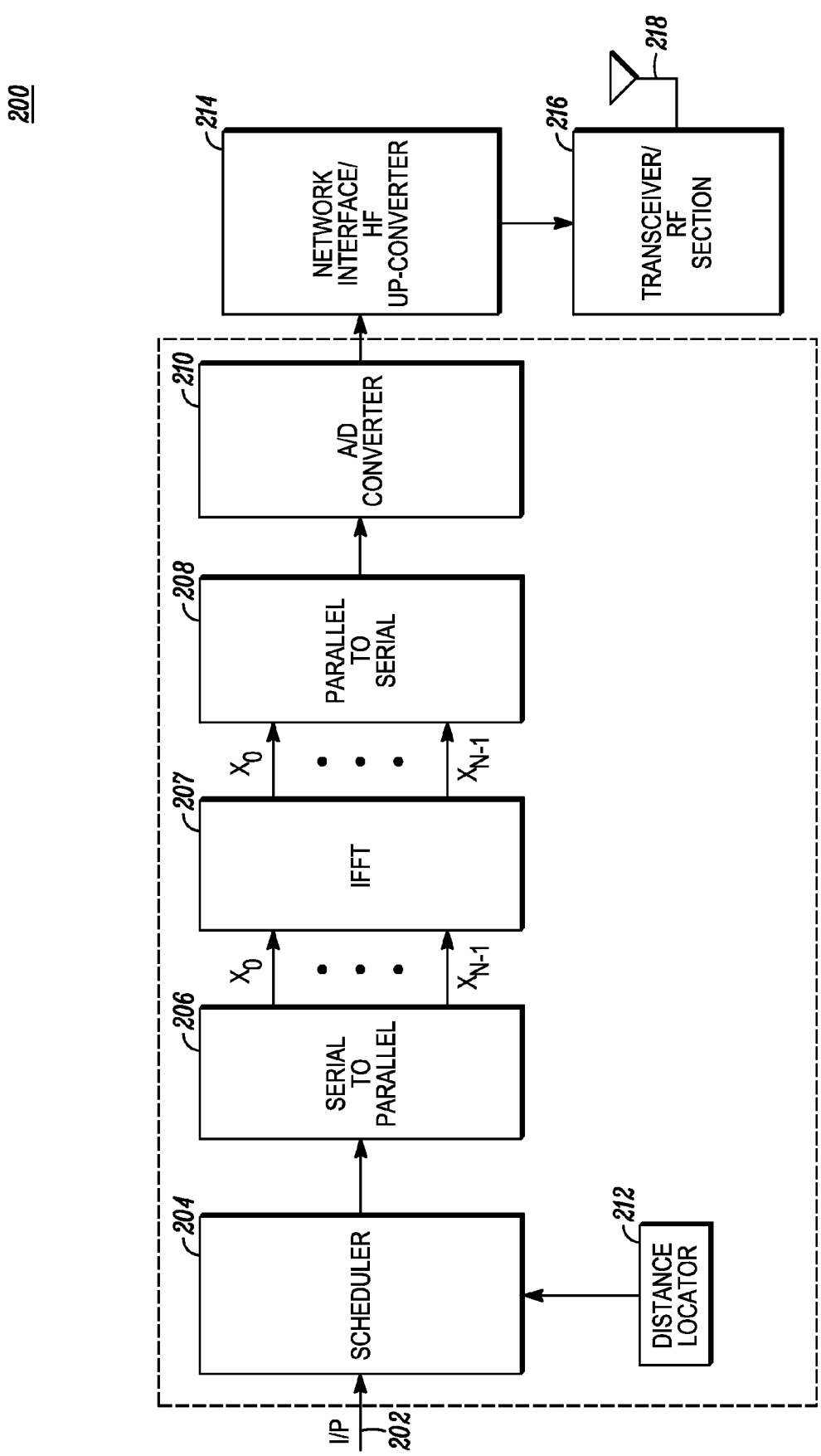
FIG. 2 is a block diagram of an orthogonal frequency-division multiplexing (OFDM) network node in accordance with some embodiments.

FIG. 2 is a block diagram 200 of an orthogonal frequency-division multiplexing (OFDM) network node in accordance with some embodiments. As an example, FIG. 2 illustrates the components of the network node 120, however it should be understood that any network node may comprise of the illustrated components. The network node 120 constructs, for example, an OFDM/OFDMA composite signal by first passing the serial output of a formatted, encoded, interleaved data signal 202 through a scheduler 204 that takes the input data and generates a downlink frame, based in part on the remote device distance locator function. The scheduler 204 then passes the output to a serial-to-parallel converter 206. Serial-to-parallel converter 206 separates each data signal into parallel data streams (e.g., $X_o \ldots X_{N-1}$). A mapping function (MAP) within serial-to-parallel converter 206 maps each parallel data stream into I and Q modulation symbols. The parallel data stream is then applied to an inverse fast Fourier transform (IFFT) block 207. The subcarrier separation is preferably an inverse of the OFDM symbol duration. IFFT block 207 computes the IFFT of each data stream and passes the output to parallel-to-serial block 208.

Parallel-to-serial block 208 combines each parallel data stream into a data signal and introduces Cyclic Prefix to aid in eliminating inter-symbol interference (ISI) and interblock interference. For operation in time division duplex (TDD) mode, parallel-to-serial block 208 inserts a guard interval (GI) into the signal. The output of the parallel-to-serial block 208 is passed to an Analog-to-Digital (A/D) converter block 210 for converting the signal from an analog signal to a digital signal. The output from this A/D converter block 210 is then passed to a network interface or a high frequency (HF) up-converter block 214. The output of the network interface or the HF up-converter block 214 is then passed to a transceiver or Radio Frequency (RF) section block 216 and transmitted via antenna 218.

The network node 120 also comprises a distance locator block 212 coupled to the scheduler 204. The distance locator block 212 provides the location information of the remote devices that are associated with the network node 120. The location information is then added to the downlink frame by the scheduler 204. It should be understood that numerous means for determining the distance between the remote device and the network node or means for determining the absolute location of the remote device may be used. For example, RSSI measurement, RTD measurement, handoff metrics, triangulation, GPS, database records, initial ranging delay, or MS absolute timing advance value, etc. The listed examples may be used individually or in combination to determine the distance.

Figure 3:
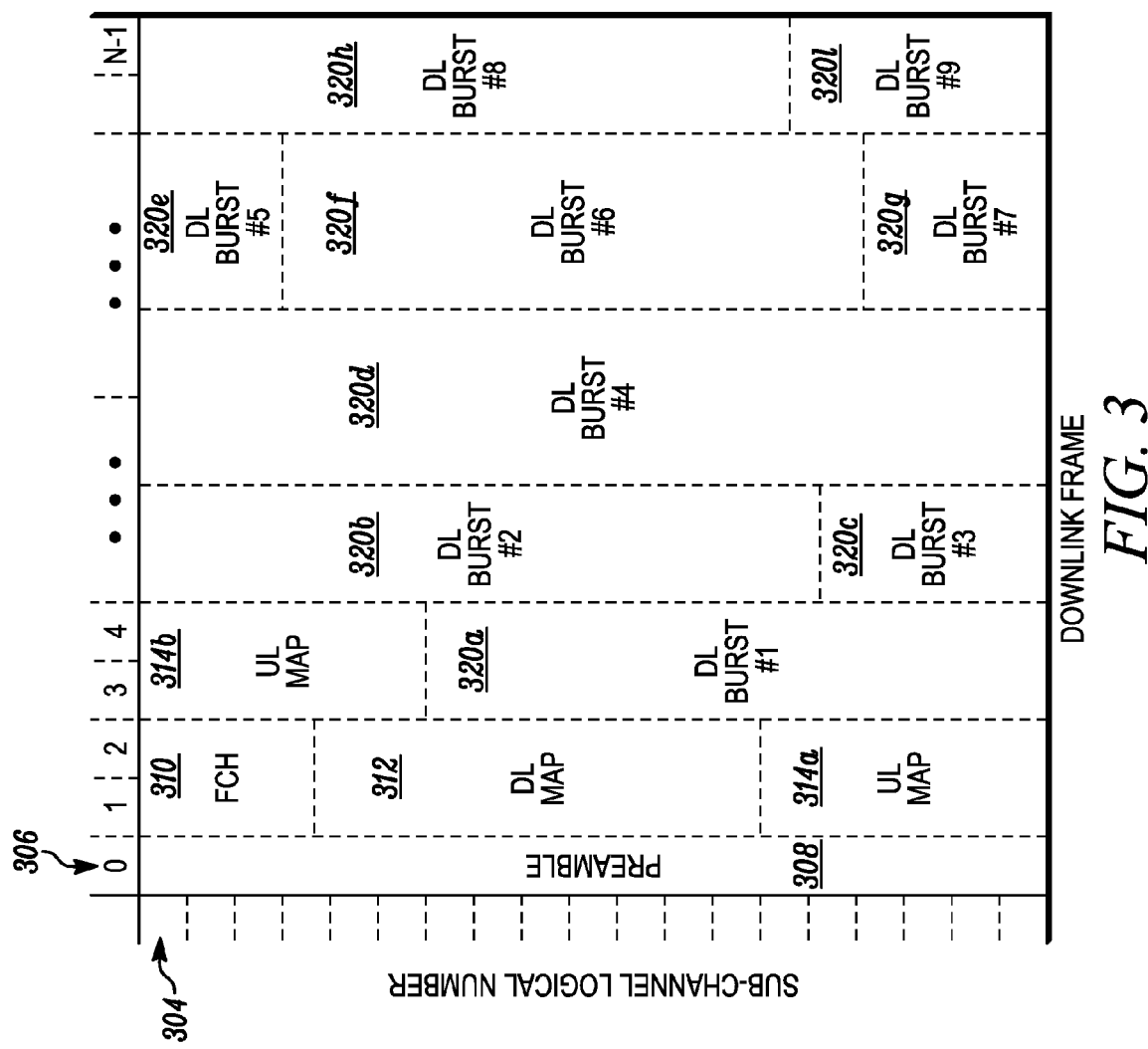
FIG. 3 is an OFDM downlink frame structure for a time division duplex (TDD) implementation in accordance with some embodiments.

FIG. 3 is a downlink frame 300 for a time division duplex (TDD) implementation of OFDM, OFDMA, WiMAX or 802.16 communications in accordance with some embodiments. The downlink frame 300 illustrates the relationship between a given sub-channel logical number 304 and a macrocell OFDM/OFDMA time slot or symbol number 306. Control information for the downlink frame 300 is used to ensure optimal system operation. For example, control information may include preamble 308, frame control header (FCH) 310, Downlink (DL) MAP 312, and Uplink (UP) map 314a and 314b (collectively referred to herein as UL-Map 314). Preamble 308 is used for synchronization and is the first symbol number 306 of downlink frame 300. FCH 310 follows preamble 308 and provides frame configuration information such as MAP message length, coding scheme and usable sub-channels. DL-MAP 312 and UL-MAP 314 provide sub-channel allocation and other control information for the DL frame 300 and an UL frame (not shown), respectively.

As illustrated, the DL frame 300 is shown with several data bursts 320a, 320b, 320c, 320d, 320e, 320f, 320g, 320h, and 320l (collectively referred to as DL burst 320). It should be understood that any suitable number of DL data bursts 320 may be included in the DL frame 300.

In one embodiment, the earlier downlink bursts are allocated to the remote devices that more distant from the network node 120 as compared to remote devices that are less distant from the network node 120. For example, data bursts 320a and 320b may be allocated to remote devices 112 and 114 that are grouped as group C, as shown in FIG. 1. In another example, data burst 320c and 320d may be allocated to remote devices 108 and 110 that are grouped as group B, and the later data bursts may be allocated to the remote devices 102, 104, and 106 that are grouped as group A. In this case, the earlier downlink symbols are allocated to the remote devices that are located at a larger distance from the network node 120 as compared to the remote devices that are located at a smaller distance from the network node 120.

Figure 4:
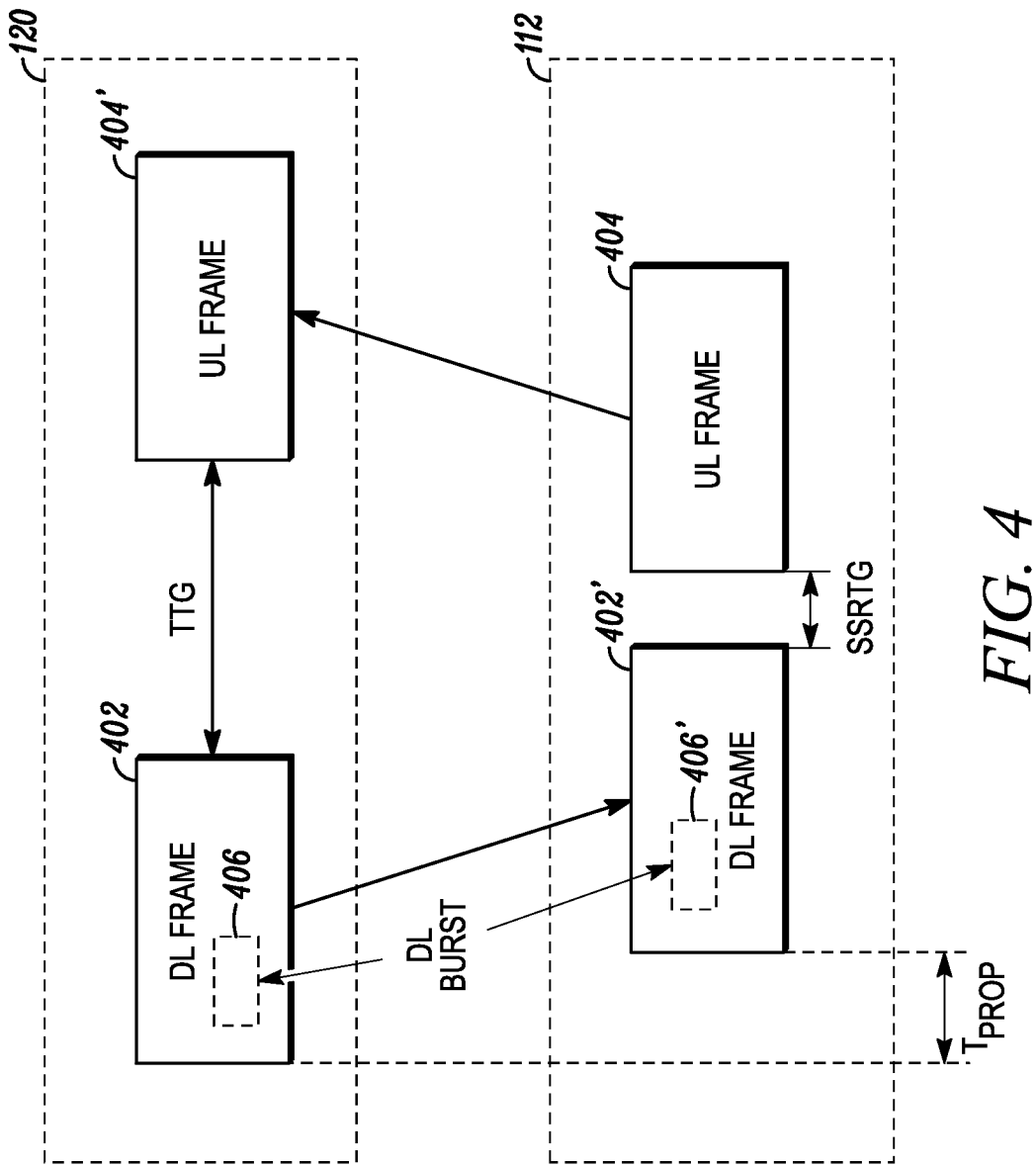
FIG. 4 is a block diagram of an OFDM downlink frame relative to an OFDM uplink frame in accordance with some embodiments.

FIG. 4 is a block diagram 400 of an OFDM/OFDMA downlink frame relative to an OFDM/OFDMA uplink frame in accordance with some embodiments. FIG. 4 illustrates a downlink (DL) frame 402 and a DL frame 402' (collectively referred to as DL frame 402), and an Uplink (UL) frame 404 and an UL frame 404' (collectively referred to as UL frame 404). As illustrated, the DL frame 402 includes DL data burst 406 and 406' (collectively referred to as DL data burst 406). The gap between the transmission of the DL frame 402 by the network node 120 and reception of the DL frame 402' at the remote device 112 is known as a propagation time ($T_{prop}$). The gap between the transmission of the DL frame 402 and reception of the UL frame 404' at the network node 120 is known as a transmit-receive transition gap (TTG). The gap between the reception of the DL frame 402 and the transmission of the UL frame 404 at the remote device 112 is known as a subscriber station receive-transmit transition gap (SS-RTG). SSRTG is the amount of time required for the remote device 112 to transition from receive mode to transmit mode. In one example, TTG is equal to a sum of SSRTG and a maximum round trip delay.

$$TTG=SSRTG+2*T_{prop}$$

In one embodiment, the network node 120, after identifying that the remote device 112 is located at a distance which is larger as compared to other remote devices that are associated with the network node 120, allocates earlier downlink symbols of the data burst 406.

In an embodiment, the allocation of the downlink symbols in the OFDM/OFDMA downlink frame is based on the location on the remote devices that are associated with a network node. As the OFDM/OFDMA downlink frame is a broadcast downlink frame, therefore the allocation of the downlink symbols by the network node is performed in such a way that reduces the TTG gap and therefore utilizes the bandwidth efficiently. The remote device 112, after the reception of the downlink frame 300 from the network node 120, uses the control information configured in a preamble and a DL Map of the downlink frame 300 to identify the location of the DL data burst 406 allocated for the remote device 112. In addition, this information may be also be used by the remote device to identify its distance from the network node.

Figure 5:
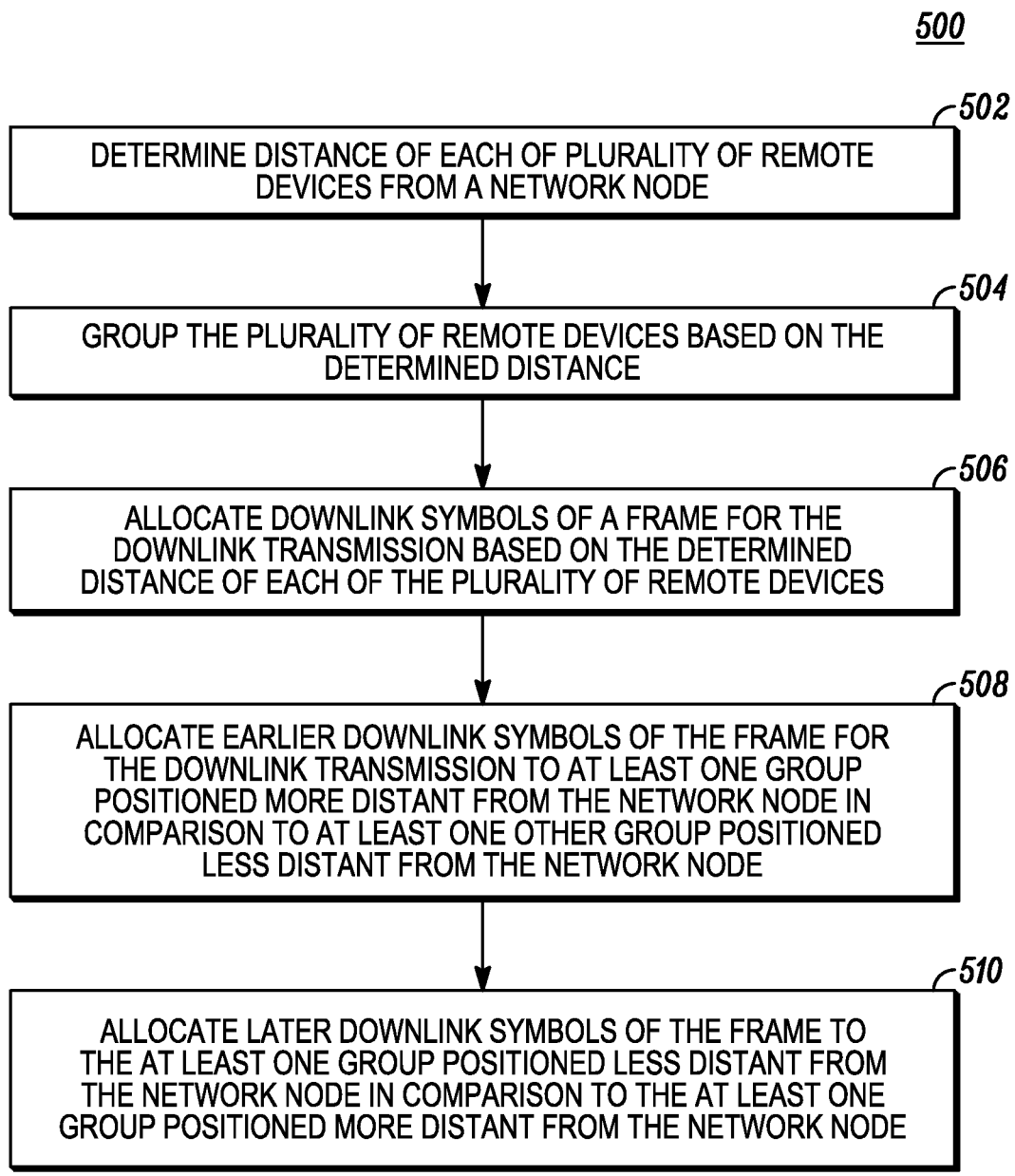
FIG. 5 is a flowchart illustrating a method of operation of the system of FIG. 1, in accordance with some embodiments.

FIG. 5 is a flowchart illustrating a method of operation 500 of the system of FIG. 1, in accordance with some embodiments. The operation 500 begins with a network node determining 502 distance of each a plurality of remote devices from the network node. The network node after determining the distance, groups 504 the plurality of remote devices based on the determined distance. Each of the groups formed by the network node contains at least one of the plurality of remote devices. The network node then allocates 506 downlink symbols of a frame for the downlink transmission based on the determined distance of each of the plurality of remote devices. The network node allocates earlier downlink symbols 508 of the frame for the downlink transmission to at least one group positioned more distant from the network node in comparison to at least one other group positioned less distant from the network node. The network node allocates later downlink symbols 510 of the frame to at least one group positioned less distant from the network node in comparison to at least one group positioned more distant from the network node.

In another embodiment, the network node allocates earlier downlink symbols to at least one remote device of the plurality of remote devices positioned more distant from the network node as compared to at least one other remote device positioned less distant from the network node. Alternatively, the network node may allocate later downlink symbols to at least one remote device of the plurality of remote devices positioned less distant from the network node as compared to at least one other remote device positioned more distant from the network node.

Figure 6:
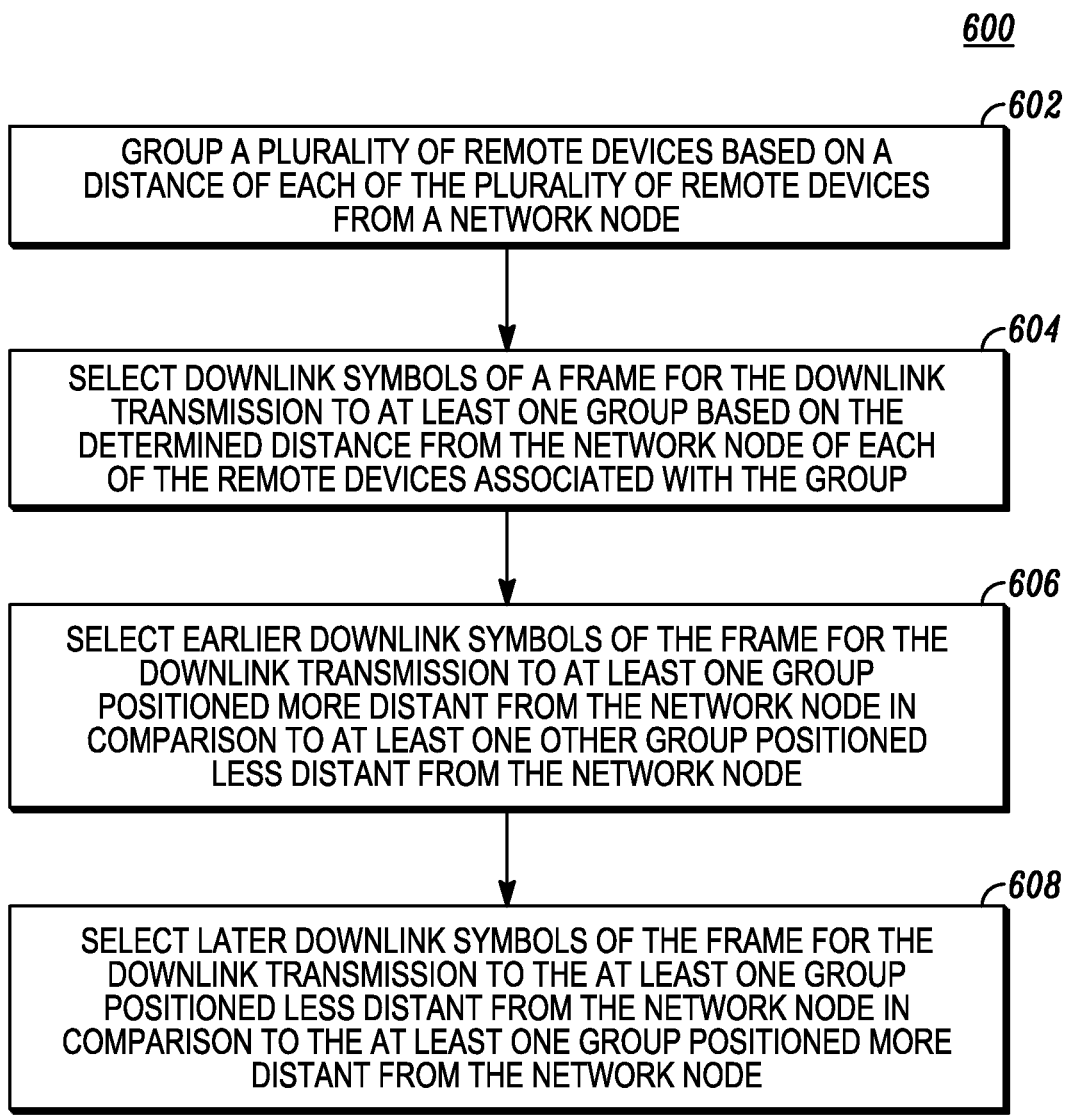
FIG. 6 is a flowchart illustrating a method of operation of the system of FIG. 1, in accordance with some embodiments.

FIG. 6 is a flowchart illustrating a method of operation 600 of the system of FIG. 1, in accordance with some embodiments. The operation 600 begins with a network node grouping 602 a plurality of remote device based on a distance of each of the plurality of remote device from the network node. The network node then selects 604 downlink symbols of a frame for the downlink transmission to at least one group based upon the determined distance from the network node of each of the remote devices associated with the group. The network node selects 606 earlier downlink symbols of the frame for the downlink transmission to at least one group positioned more distant from the network node in comparison to at least one other group positioned less distant from the network node. The network node selects 608 later downlink symbols of the frame for the downlink transmission to at least one group positioned less distant from the network node in comparison to at least one group positioned more distant from the network node.

Figure 7:
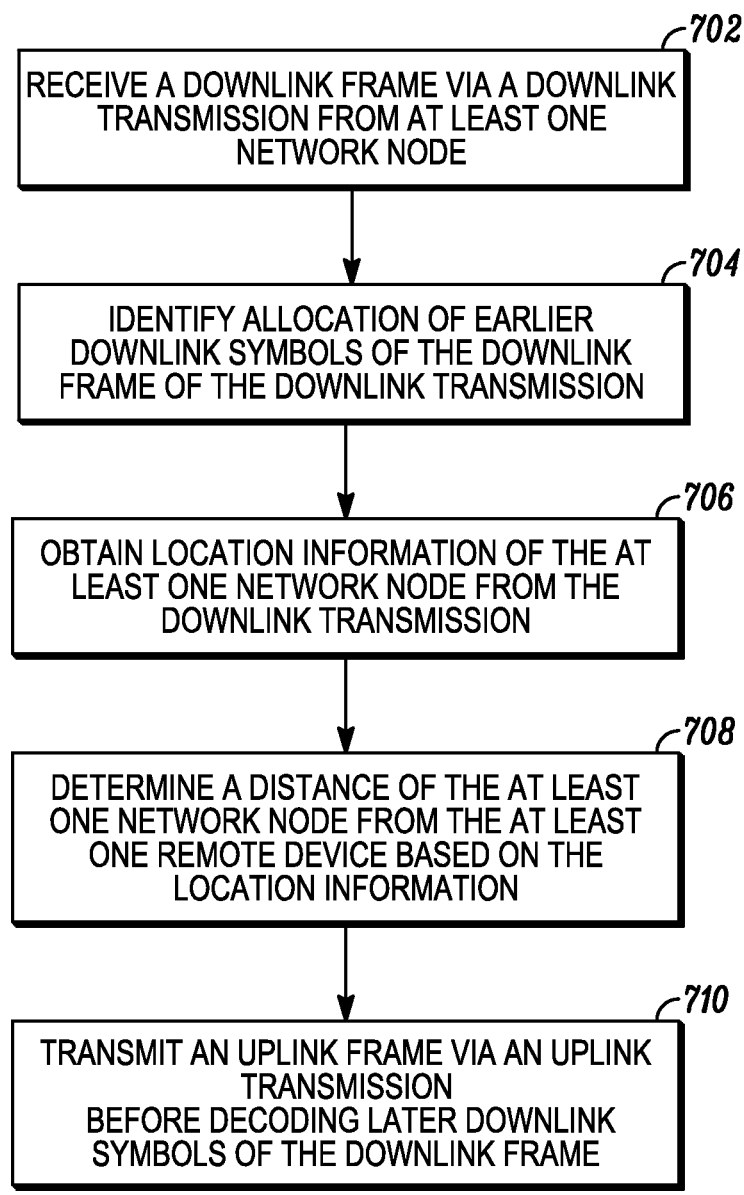
FIG. 7 is a flowchart illustrating a method of operation of the system of FIG. 1, in accordance with some embodiments.

FIG. 7 is a flowchart illustrating a method of operation 700 of the system of FIG. 1, in accordance with some embodiments. The operation 700 begins with a remote device receiving 702 a downlink frame via a downlink transmission from at least one network node. The remote device then identifies 704 the allocation of earlier downlink symbols of the downlink frame of the downlink transmission. The information related to the allocation of the downlink symbols may be obtained by the remote device using control information from a preamble and a Downlink Map. The remote device then obtains 706 location information of the at least one network node from the downlink transmission and determines 708 a distance of the at least one network node from the at least one remote device based on the location information. Thereafter, the remote device transmits 706 an uplink frame via an uplink transmission before decoding later downlink symbols of the frame. In one example, timing advance values received during ranging determines when the remote device will transit from a receive mode to a transmit mode. In another example, the timing advance value also determines whether the remote device should decode the entire downlink frame or should transit from the receive mode to the transmit mode after decoding only the DL burst allocated to the device and not the entire frame.

In one embodiment, a remote device identifies that it has been assigned with earlier downlink symbols because of its distant location from a network node that transmitted the downlink frame. After identifying that it has been allocated with earlier downlink symbols, the remote device switches from receive mode to a transmit mode after decoding the allocated downlink symbols, and before decoding the later downlink symbols of the downlink frame. This switch in the mode by the remote device before decoding the later downlink symbols utilizes the bandwidth resources efficiently and effectively decreases the transition gap by an amount equal to the later downlink symbols that were not decoded by the remote device.

In normal OFDM/OFDMA systems, the remote device waits until it receives all DL symbols before transitioning from a receive mode to a transmit mode. However, in the present embodiment, the remote device starts the $R_x$ (receive)-to-$T_x$ (transmit) transition before the end of DL frame reception. This instruction is conveyed to the remote device during ranging. Ranging is a process by which the network node measures and reports to the remote device the transmit timing error of said device. This timing error is primarily the result of the round trip propagation delay of the signal between the network node and the remote device. The remote device keeps track of this timing error and advances its transmit launch time by an amount equal to this timing error. As a result, the remote device UL frame transmissions arrive at the network node synchronized to the correct symbol boundary. This timing advance value obtained through the ranging process is the instruction to the remote device to transition from the receive mode to the transmit mode before the last DL frame symbol is received. The remote device behavior is modified such that it transitions from the receive mode to the transmit mode based on the timing advance value, regardless of whether this transition occurs before or after the end of the DL frame.

Advantages of the various embodiments may include maximizing the use of the downlink frame bandwidth, extending the cell radius to a maximal value that is limited only by RF link budget constraints, and reducing fixed network capital expenditures by minimizing the number of cell sites required for a deployment. Those skilled in the art will realize that the above advantages and other advantages described herein are merely illustrative and are not meant to be a complete rendering of all of the advantages of the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for optimizing downlink transmission in a wireless communication network, the method comprising:

determining a distance of each of a plurality of remote devices from a network node; and allocating downlink symbols of a frame for the downlink transmission based on the determined distance of each of the plurality of remote devices, wherein earlier downlink symbols of the frame that are associated with one or more data bursts positioned at a beginning of the frame are allocated to at least one remote device of the plurality of remote devices positioned more distant from the network node in comparison to at least one other remote device positioned less distant from the network node.

2. The method of claim 1, further comprising grouping the plurality of remote devices based on the determined distance of each of the plurality of remote devices, wherein each group comprises at least one remote device of the plurality of remote devices.

3. The method of claim 2, further comprising allocating earlier downlink symbols of the frame for the downlink transmission to at least one group positioned more distant from the network node in comparison to at least one other group positioned less distant from the network node.

4. The method of claim 2, further comprising allocating later downlink symbols of the frame to at least one group positioned less distant from the network node in comparison to at least one other group positioned more distant from the network node.

5. The method of claim 1, wherein the frame of the downlink transmission comprises at least one of an Orthogonal Frequency Division Multiple Access (OFDMA) frame or an Orthogonal Frequency Division Multiplexing (OFDM) frame.

6. A method for optimizing downlink transmission in a wireless communication network, the method comprising:

grouping a plurality of remote devices based on a distance of each of the plurality of remote devices from a network node, wherein each group comprises at least one remote device of the plurality of remote devices; and selecting downlink symbols of a frame for the downlink transmission to at least one group based upon the determined distance from the network node of each of the remote devices associated with the group, wherein earlier downlink symbols of the frame that are associated with one or more data bursts positioned at a beginning of the frame are allocated to at least one group positioned more distant from the network node in comparison to at least one other group positioned less distant from the network node.

7. The method of claim 6, further comprising selecting later downlink symbols of the frame for the downlink transmission to at least one group positioned less distant from the network node in comparison to at least one other group positioned more distant from the network node.

8. The method of claim 6, wherein the frame of the downlink transmission comprises at least one of an Orthogonal Frequency Division Multiple Access (OFDMA) frame or an Orthogonal Frequency Division Multiplexing (OFDM) frame.

9. A network node, comprising:

a transceiver;

a processing unit, coupled to the transceiver wherein the processing unit being, adapted to determine a distance of each of a plurality of remote devices from a network node; and adapted to allocate downlink symbols of a frame for a downlink transmission based upon the determined distance of each of the plurality of remote devices, and wherein earlier downlink symbols of the frame that are associated with one or more data bursts positioned at a beginning of the frame are allocated to at least one remote device of the plurality of remote devices positioned more distant from the network node in comparison to at least other remote device positioned less distant from the network node.

10. The network node of claim 9, wherein the processing unit is further adapted to group the plurality of remote devices based on the distance of each of the plurality of remote devices from the network node, wherein each group comprises at least one remote device of the plurality of remote devices.

11. The network node of claim 10, wherein the processing unit is further adapted to allocate earlier downlink symbols of the frame for the downlink transmission to at least one group positioned more distant from the network node in comparison to at least one other group positioned less distant from the network node.

12. The network node of claim 10, wherein the processing unit is further adapted to allocate later downlink symbols of the frame to at least one group positioned less distant from the network node in comparison to at least one other group positioned more distant from the network node.

* * * * *